US011193590B2

(12) United States Patent
Black

(10) Patent No.: US 11,193,590 B2
(45) Date of Patent: Dec. 7, 2021

(54) SEAL ASSEMBLY WITH BUFFERED LIP SEAL

(71) Applicant: Rolls-Royce Corporation, Indianapolis, IN (US)

(72) Inventor: Joseph Dean Black, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 212 days.

(21) Appl. No.: 16/697,398

(22) Filed: Nov. 27, 2019

(65) Prior Publication Data
US 2020/0224769 A1 Jul. 16, 2020

Related U.S. Application Data

(60) Provisional application No. 62/792,260, filed on Jan. 14, 2019.

(51) Int. Cl.
*F16J 15/34* (2006.01)
*F01D 11/00* (2006.01)
(Continued)

(52) U.S. Cl.
CPC ....... *F16J 15/3412* (2013.01); *F16J 15/3464* (2013.01); *F01D 11/003* (2013.01);
(Continued)

(58) Field of Classification Search
CPC .... F16J 15/3412; F16J 15/164; F16J 15/3452; F16J 15/3464; F16J 15/441; F16J 15/445;
(Continued)

(56) References Cited

U.S. PATENT DOCUMENTS 5,014,999 A * 5/1991 Makhobey ............ F01D 11/003
277/422
5,503,407 A 4/1996 McNickle
(Continued)

FOREIGN PATENT DOCUMENTS

EP 0870136 A1 10/1998
EP 2302266 A1 3/2011
(Continued)

OTHER PUBLICATIONS

European Office Action dated Apr. 26, 2021 issued in connection with EP Appln. No. 19218056.0, 4 pages.
(Continued)

*Primary Examiner* — Gilbert Y Lee
(74) *Attorney, Agent, or Firm* — Barnes & Thornburg LLP

(57) ABSTRACT

Systems and methods are presented for sealing a higher pressure fluid cavity from a lower pressure fluid cavity in a rotating machine. The cavities are at least partially disposed between a rotatable shaft and a housing. The seal assembly comprises a runner mounting assembly, a circumferential ceramic runner, a carbon seal ring, and an annular seal member. The carbon seal ring is sealing engaged with the housing and at least a portion of the runner to thereby form a boundary between the higher pressure fluid cavity and the lower pressure fluid cavity. The annular seal member is coupled to the housing axially displaced from the seal ring in the lower pressure fluid cavity. The seal member has a curvilinear face surface that engages the runner.

20 Claims, 3 Drawing Sheets

(51) Int. Cl.
*F16J 15/16* (2006.01)
*F16J 15/44* (2006.01)

(52) U.S. Cl.
CPC .......... *F16J 15/164* (2013.01); *F16J 15/3452* (2013.01); *F16J 15/441* (2013.01)

(58) Field of Classification Search
CPC ........ F16J 15/44; F16J 15/3268; F16J 15/166; F05D 2260/30; F05D 2260/38; F01D 11/003
See application file for complete search history.

(56) References Cited

U.S. PATENT DOCUMENTS

| | | | |
|---|---|---|---|
| 5,813,830 A | 9/1998 | Smith | |
| 6,322,081 B1* | 11/2001 | Ullah | F16C 33/76 277/504 |
| 9,359,912 B2 | 6/2016 | Ullah | |
| 2007/0025835 A1 | 2/2007 | Gockel | |
| 2009/0142180 A1 | 6/2009 | Munson | |
| 2009/0322031 A1* | 12/2009 | Roche | F01D 11/02 277/348 |
| 2012/0177486 A1 | 7/2012 | Ullah | |
| 2013/0241153 A1* | 9/2013 | Garrison | F16J 15/40 277/350 |
| 2014/0265151 A1 | 9/2014 | Vasagar | |

FOREIGN PATENT DOCUMENTS

| | | |
|---|---|---|
| EP | 2302266 | 7/2016 |
| EP | 2474711 | 7/2018 |
| WO | 1997026475 A1 | 7/1997 |
| WO | 2014/143097 | 9/2014 |

OTHER PUBLICATIONS

Extended European Search Report, European Application No. 19218056.0-1015, dated Jun. 27, 2020, 8 pages.

* cited by examiner

SEAL ASSEMBLY WITH BUFFERED LIP SEAL

CROSS-REFERENCE TO RELATED APPLICATION

The present application is a non-provisional application of, and claims priority to, U.S. Provisional Application No. 62/792,260, filed Jan. 14, 2019. The entirety of this prior application is hereby incorporated by reference.

BACKGROUND

Seals and seal assemblies may be used to isolate cavities of different pressures in a machine. For example, in a gas turbine engine a seal assembly may be used to buffer a sump from higher pressure and temperature airflows elsewhere in the engine. Seal assemblies in rotating machines such as gas turbine engines often have difficulty in maintaining an effective seal across all operating conditions of the engine. Seal assemblies also generally require heat removal during operation—such as through the application of a flow of oil to the assembly—making the seal assembly more complex and failure-prone than may be desirable.

SUMMARY

According to some aspects of the present disclosure, a seal assembly is disclosed for sealing a higher pressure fluid cavity from a lower pressure fluid cavity. The cavities are at least partially disposed between a rotatable shaft and a housing radially displaced from the rotatable shaft. The seal assembly comprises a runner mounting assembly, a circumferential ceramic runner, a carbon seal ring, and an annular seal member. The runner mounting assembly is carried by the shaft. The circumferential ceramic runner is carried by the runner mounting assembly and has a radially outward facing seal surface extending axially along the shaft. The carbon seal ring is sealing engaged with the housing and has a radially inward facing seal surface that sealingly engages at least a portion of the radially outward facing seal surface of the runner to thereby form a boundary between the higher pressure fluid cavity and the lower pressure fluid cavity. The annular seal member is coupled to the housing axially displaced from the seal ring in the lower pressure fluid cavity. The seal member has a curvilinear face surface that engages the radially outward facing seal surface of the runner.

In some embodiments the higher pressure fluid cavity comprises at least in part a buffer air chamber, and wherein a plurality of apertures extending axially through the seal ring direct a flow of buffer air from the buffer air chamber toward the annular seal member. In some embodiments the runner mount assembly comprises a metallic runner mount. In some embodiments the runner is carried by the runner mount by an interference fit.

In some embodiments the curvilinear face surface bends from an axially-facing surface to a radially-facing surface, and wherein the radially-facing surface engages the radially outward facing seal surface of the runner. In some embodiments the annular seal member has a J-shaped cross section taken along the shaft. In some embodiments the annular seal member comprises Teflon. In some embodiments the annular seal member comprises a flexible ring that bends in contact with the runner.

In some embodiments the runner comprises one or more of silicon carbide, silicon nitride, and alumina. In some embodiments the seal ring is an archbound seal ring. In some embodiments the runner and the seal ring are formed from materials having coefficients of thermal expansion that are matched to effect sealing engagement between the runner and the seal ring over a predetermined range of operating temperatures.

In some embodiments the seal assembly further comprises a garter spring coupled to a radially outward facing surface of the seal ring, the garter spring sealingly engaging the radially inward facing seal surface of the seal ring with the radially outward facing seal surface of the ceramic runner across a predetermined range of rotational speeds.

According to further aspects of the present disclosure, a method is disclosed of sealing a higher pressure fluid cavity from a lower pressure fluid cavity. The cavities are at least partially disposed between a rotatable shaft and a housing radially displaced from the rotatable shaft. The method comprises providing a ceramic circumferential runner, a carbon seal ring, and an annular seal member, wherein the ceramic circumferential runner is carried by a runner mounting assembly coupled to the shaft, the runner having a radially outward facing seal surface extending axially along the shaft, the carbon seal ring is disposed radially outward of the runner and defines a plurality of apertures passing axially through the seal ring, and the annular seal member is axially displaced from the carbon seal ring; rotating the shaft to sealingly engage the seal surface of the runner with the carbon seal ring and the annular seal member; and directing a flow of buffer air through one or more of the plurality of apertures and toward the annular seal member.

In some embodiments the method further comprises buffering the annular seal member with the flow of buffer air. In some embodiments the method further comprises engaging a garter spring about a radially outward facing surface of the seal ring. In some embodiments the method further comprises flexing the ceramic runner relative to the shaft. In some embodiments the method further comprises providing a seal housing coupled to the housing; and engaging the seal ring with the seal housing.

According to still further aspects of the present disclosure, a seal assembly is disclosed for sealing a higher pressure fluid cavity from a lower pressure fluid cavity. The cavities are at least partially disposed between a rotatable shaft and a housing radially displaced from the rotatable shaft. The seal assembly comprises a circumferential ceramic runner, a carbon seal ring, and an annular seal member. The circumferential ceramic runner is carried by the shaft. The carbon seal ring is sealing engaged with the housing and at least a portion of the runner to thereby form a boundary between the higher pressure fluid cavity and the lower pressure fluid cavity. The annular seal member coupled to the housing axially displaced from the seal ring in the lower pressure fluid cavity. The seal member has a J-shaped cross section taken along the shaft and a curvilinear face surface that engages the runner.

In some embodiments the curvilinear face surface bends from an axially-facing surface to a radially-facing surface, and wherein the radially-facing surface engages the radially outward facing seal surface of the runner. In some embodiments the annular seal member comprises Teflon.

BRIEF DESCRIPTION OF THE DRAWINGS

The following will be apparent from elements of the figures, which are provided for illustrative purposes.

Figure 1A:
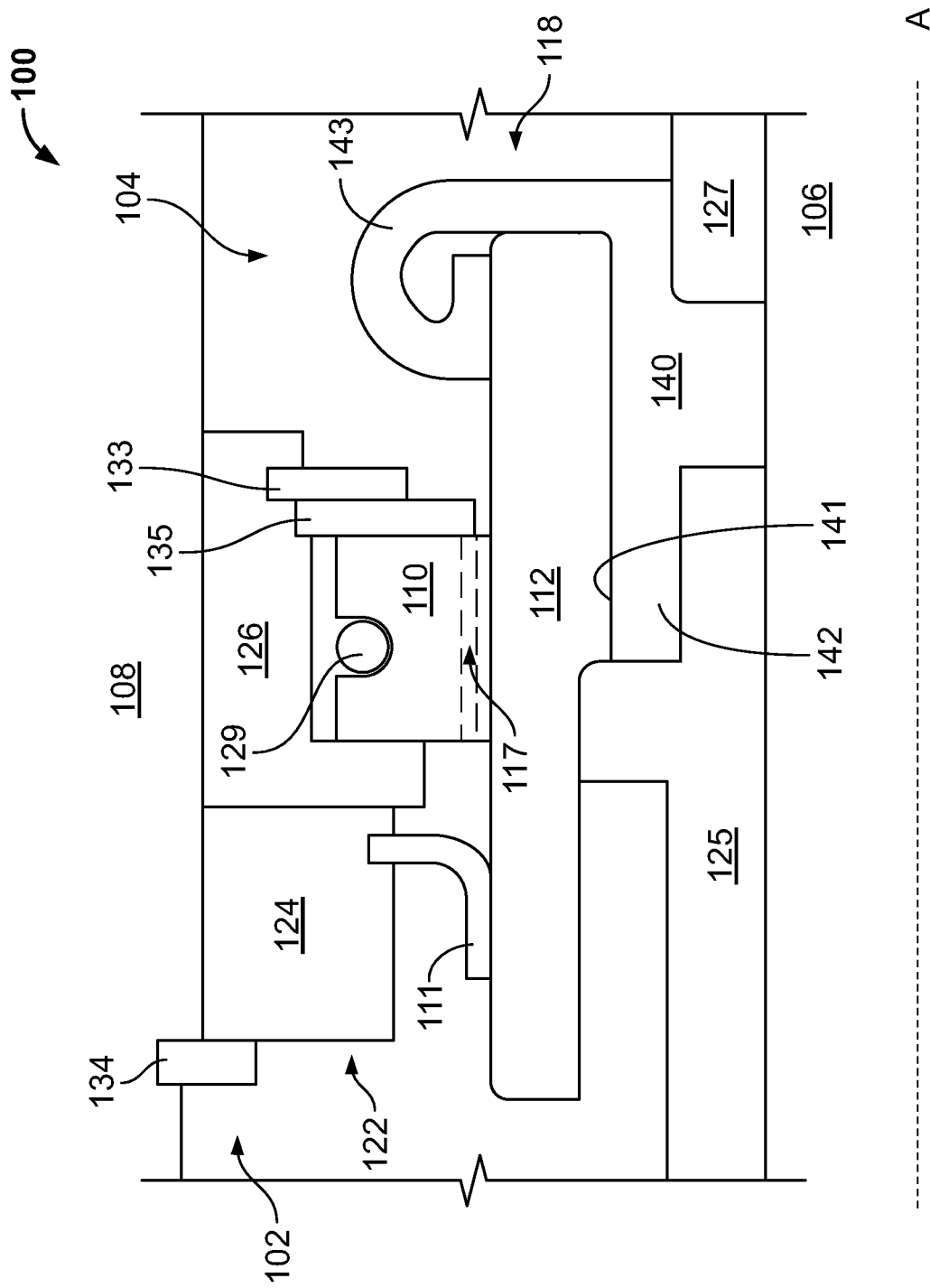
FIG. 1A is a schematic cross sectional view of a seal assembly in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Carbon seal assemblies in rotating machines such as gas turbine engines typically comprise a seal ring engaged with a runner. The runner is carried by a rotatable shaft. Engagement between the seal ring and runner creates the seal. However, in many seal assemblies engagement between the seal ring and runner is not maintained during all or substantially all operating conditions. Machine operation generally causes wide fluctuations in the temperatures to which the seal ring and runner are exposed, and as the components are subject to these changing temperatures they may expand or contact at different rates and therefore become sufficiently separated as to lose engagement and thus decrease the effectiveness of the seal.

Examples of engine operations that can lead to ineffective sealing of the seal assembly include takeoff-to-cruise and cruise-to-idle operations. In each operation, the seal assembly is exposed to operating temperatures that are substantially lower than previous operating temperatures. As a result, the shaft and runner typically contract at a faster rate than the seal ring, thus potentially creating a gap in the seal assembly. The gap may allow leakage of air and oil into adjacent spaces.

Leakage through a seal assembly can have several negative consequences. Leakage of oil past a seal ring and into a hot chamber of the engine (such as a turbine flowpath) creates the risk of oil coking and/or fires. Oil leakage also may contaminate airflow in the adjacent space and thus creates the risk of oil entrained in a bleed air flowpath, leading to an oil smell in the cabin of an aircraft.

A seal assembly comprising a metal runner typically requires heat removal during operation so as to avoid an overheated condition. In many seal assemblies, a flow of oil is applied to the runner to transfer heat away from the runner. However, directing an oil flow to the runner requires more complex and larger pathways for supplying and collecting the oil than would otherwise be necessary. It is therefore desirable that a seal assembly comprise a runner that does not require heat removal during operation, or does not require the direct application of oil for heat removal during operation.

The present disclosure is therefore directed to seal assemblies that maintain effective engagement between the seal ring and the runner across a wide range of temperatures and operating conditions. Specifically, the present disclosure is directed to systems and methods of forming a seal in a rotating machine. A seal assembly may comprise runner, a seal ring, and an annular seal member. The annular seal member may be buffered by a flow of buffer air from an adjacent chamber.

The use of an annular seal member buffered by a flow of buffer air across the seal member may be particularly advantageous in that a small gap may be formed between the seal member and runner, resulting in reduced wear of the seal member and reduced oil leakage across the seal member. The annular seal member and runner, and/or the seal ring and runner, may also comprise materials with the same or similar coefficients of thermal expansion, thus allowing the seal member, seal ring, and/or runner to thermally expand and contract at similar rates and reducing gaps between the seal member, seal ring, and/or runner.

Figure 1B:
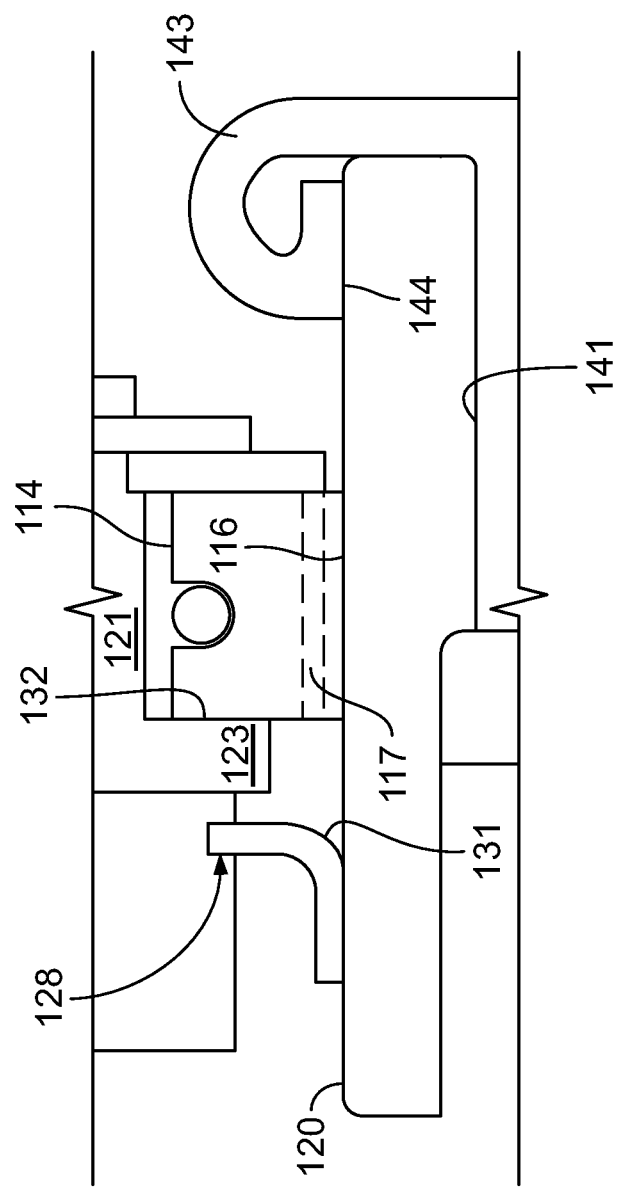
FIG. 1B is a detailed schematic cross sectional view of a seal assembly in accordance with some embodiments of the present disclosure.

A schematic cross sectional view of an embodiment of the seal assembly 100 is provided in FIGS. 1A and 1B. The seal assembly 100 seals a higher pressure fluid cavity 104 from a lower pressure fluid cavity 102. The higher and lower pressure fluid cavities 104, 102 may be at least partially disposed between a rotatable shaft 106 and a housing 108. The seal assembly 100 comprises a seal ring 110, an annular seal member 111, and circumferential runner 112.

The higher pressure fluid cavity 104 may be referred to as a first cavity, and may be, for example, a region of a rotating machine such as a gas turbine engine that receives and directs higher pressure and/or higher temperature airflow. All or a portion of the higher pressure fluid cavity 104 may comprise a buffer air chamber.

The lower pressure fluid cavity 102 may be referred to as a second cavity, and may be, for example, a region of a rotating machine such as a gas turbine engine that receives and directs lower pressure and/or lower temperature airflow. The lower pressure cavity 102 may be a sump or bearing chamber.

The rotatable shaft 106 may define an axis A of the rotating machine. The rotatable shaft may be hollow. A housing 108 may be disposed about or radially outward of the rotatable shaft 106. The housing 108 may be radially displaced from the shaft 106. The housing 108 may be a static structure of the rotating machine (i.e. may not rotate). The housing 108 may be a sump housing or similar structure, and may at least partly define each of the higher pressure fluid cavity 104 and lower pressure fluid cavity 102.

The seal ring 110 is disposed between the housing 108 and the shaft 106. The seal ring 110 may be annular, and may be formed as a single member or may comprise more than one member. In embodiments having a seal ring 110 comprising more than one member, the member may be joined for example by slip joints. The seal ring 110 may also comprise a single annular member. The seal ring 110 may have a radially outward facing surface 114 and a radially inward facing seal surface 116. The seal ring may comprise carbon.

The runner 112 may be an annular member and may be radially displaced from the shaft 106. The runner 112 may be carried by the shaft 106. The runner 112 may be carried by a runner mounting assembly 118 coupled to the shaft 106. The runner 112 may have a radially outward facing surface 120 extending axially along the shaft 106. The runner 112 may comprise ceramic. The runner 112 may comprise silicon carbide, silicon nitride, or alumina.

The seal ring 110 may be an archbound carbon seal. The seal ring 110 may be an interference carbon seal, or, over time, may become an archbound carbon seal with operation of the system.

The seal ring 110 may sealingly engage the runner 112. A seal ring 110 that is sealingly engaged with a runner 112 is in contact with the runner 112 or in sufficient proximity to the runner 112 such that a seal is formed between the seal ring 110 and runner 112. The radially inward facing surface 116 of the seal ring 110 may sealingly engage the radially outward facing surface 120 of the runner 112. In some embodiments, the radially inward facing surface 116 of the seal ring 110 may contact the radially outward facing surface 120 of the runner 112.

The seal ring 110 and runner 112 may be formed from materials having coefficients of thermal expansion that are matched to effect sealing engagement between the seal ring 110 and runner 112. For example, in some embodiments the seal ring 110 comprises carbon or a carbon-based material and the runner 112 comprises ceramic. The use of materials with similar or matched coefficients of thermal expansion ensures a consistent seal is maintained throughout a range of thermal transients, such as during start-up, operational transients, idling, and shutdown. The similar or matched coefficients of thermal expansion allow the seal ring 110 and runner 112 to thermally expand and contract at similar rates and thus limit both air ingress into lower pressure fluid cavity 104 and oil ingress into higher pressure fluid cavity 102. The sealing engagement between the seal ring 110 and runner 112 may be effected over a predetermined range of operating temperatures.

The annular seal member 111 is axially displaced from the seal ring 110 and may comprise a flexible and/or semi-rigid material. The annular seal member 111 may be referred to as a lip seal or a lip seal member. The annular seal member 111 may comprise Teflon or a Teflon derivative material. The annular seal member 111 may be an annular flexible ring that is flexed when positioned relative to the runner 112 (i.e. the annular seal member 111 may be flexed by contact with the runner 112). In some embodiments the annular seal member 111 may be formed as a curved member having a J-shaped cross section. The annular seal member 111 may have a curvilinear face surface 131 that engages the radially outward facing seal surface 120 of the runner 112. The curvilinear face surface 131 may extend from an axially-facing surface to a radially-facing surface, and the radially-facing surface engages the radially outward facing seal surface 120 of the runner 112.

The seal ring 110 may define a plurality of apertures 117 that extend axially through the seal ring 110. During operation, with a higher fluid pressure in the higher pressure fluid cavity 104 as compared to the lower pressure fluid cavity 102, the apertures 117 direct a flow of buffer air from the higher pressure fluid cavity 104 toward the annular seal member 111. The plurality of apertures 117 may be dimensioned and/or spaced about the circumference of the seal ring 110 to achieve a desired flow rate of buffer air.

The flow of buffer air flows through the plurality of apertures 117 and contacts the curvilinear face surface 131 of the annular seal member 111. The flow of buffer air across the annular seal member 111 buffers the annular seal member 111 and may reduce the friction between the annular seal member 111 and the runner 112. The flow of buffer air additionally reduces leakage from the lower pressure fluid cavity 102 toward the higher pressure fluid cavity 104 past the annular seal member 111 and/or the seal ring 110.

In some embodiments, the seal assembly 100 further comprises a seal housing 122. The seal housing 122 may be disposed between the runner 112 and the housing 108, and/or between the seal ring 110 and the housing 108, and/or between the annular seal member 111 and the housing. The seal housing 122 may comprise a forward seal housing 124 and an aft seal housing 126.

The forward seal housing 124 may define a recess 128 or may cooperate with the aft seal housing 126 to define a recess 128. The recess 128 may be an annular groove. At least a portion of the annular seal member 111 may be disposed in or held in axial position by the recess 128. The forward seal housing 124 may be prevented from axially forward movement relative to the housing 108 by a housing stop 134.

The aft seal housing 126 may comprise an axially-extending portion 121 and a radially-extending portion 123. The axially extending portion 121 may be engaged with or in contact with the housing 108. The radially extending portion 123 may comprise an axially facing surface 132 and may be engaged with or in contact with the seal ring 110. The seal ring 110 may sealingly engage the axially facing surface 132 of the radially extending portion 123 of the seal housing 122. The seal ring 110 may be aided in sealingly engaging the axially facing surface 132 by the axial load on the seal ring 110 caused by the pressure difference between the higher pressure cavity 104 and lower pressure cavity 102.

The forward seal housing 124 and aft seal housing 126 may be integrally formed as a single seal housing 122.

In some embodiments, the seal assembly 100 further comprises a runner mounting assembly 118. The runner mounting assembly 118 may be carried by the shaft 106, and may extend radially from the shaft 106 to space the runner 112 from the shaft 106. The runner mounting assembly 118 may be interference fit to the shaft 106, and may be axially held in position by one or both of a forward stop 125 and aft stop 127. The runner mounting assembly 118 may be referred to as a mounting element. The runner mounting assembly 118 may carry the runner 112.

The runner mounting assembly 118 may allow for some relative movement between the runner 112 and the shaft 106, largely owing to different coefficients of thermal expansion of the materials of the runner 112 and the shaft 106. Due to the runner mounting assembly 118, the runner 112 may flex relative to the shaft 106.

In some embodiments, the runner mounting assembly 118 may comprise a runner mount 140. The runner mount 140 may comprise a base 142 forming a radially outward facing mount surface 141 extending axially along the shaft 106, and a mounting member 143 extending radially outward from the base 142 and axially along the shaft 106 forming a radially inward facing mount surface 144. The radially inward facing mount surface 144 may extend axially along the shaft 106 a distance less than said radially outward facing mount surface 141 of said base 142. The runner 112 may be interference fit between at least a portion of the radially outward facing mount surface 141 and at least a portion of the radially inward facing mount surface 144. The runner mount assembly 118 and/or runner mount 140 may comprise metal. The runner mount 140 shown in FIGS. 1A and 1B is an exemplary embodiment of the present disclosure and the present disclosure is not limited to the illustrated runner mount 140.

In some embodiments, the seal assembly 100 further comprises a garter spring 129. The garter spring 129 may be disposed radially outward of and engaged with a radially outer surface of the seal ring 110. The garter spring 129 may aide with maintaining engagement of the seal ring 110 to the runner 112 across a predetermined range of rotational speeds.

In some embodiments, the seal assembly 100 further comprises one or more of a snap ring 133 and back plate 135. The snap ring 133 may extend between the seal housing 122 and the runner 112, and may be positioned axially aft of the seal ring 110. The back plate 135 may be positioned axially aft of the seal ring 110 and adjacent and/or abutting the snap ring 133.

In a non-operating condition, the shaft 106 is not rotating and the garter spring 129 imparts a radially inward force on the seal ring 110 to maintain the seal ring 110 sealingly engaged against the runner 112. The seal ring 110 sealingly engaged with the runner 112 and seal housing 122 creates a seal between the higher pressure fluid cavity 104 and the lower pressure fluid cavity 102. The seal ring 110 forms a boundary between the higher pressure fluid cavity 104 and the lower pressure fluid cavity 102.

When the rotating machine begins to operate, friction between the seal ring 110 and runner 112 will generate heat, causing thermal expansion of these components. With matched coefficients of thermal expansion, the seal ring 110 and runner 112 will thermally expand at the same or similar rates, thus ensuring that the seal ring 110 and runner 112 will remain engaged throughout the full range of thermal transients caused by startup and operation of the rotating machine. Any radial gap between the seal ring 110 and runner 112 will similarly remain at a constant or near-constant radial dimension throughout the full range of thermal transients, thus providing a consistent air leakage rate which may be preferable to leakage rates in the prior art that may vary considerably. Minimizing or preventing the radial gap between the seal ring 110 and runner 112 reduces or prevents oil leakage from the lower pressure fluid cavity 102. The shaft 106 will deflect due to rotation, but the modulus of elasticity of ceramics are very large so this deflection will be very low and therefore negligible compared to thermal expansion deflections.

During operation of the rotating machine, a differential pressure between the fluid pressures of the higher pressure fluid cavity 104 and the lower pressure fluid cavity 102 creates a flow of buffer air. The flow of buffer air flows through the plurality of apertures 117 of the seal ring 110 and contacts the curvilinear face surface 131 of the annular seal member 111. The flow of buffer air across the annular seal member 111 may reduce the friction between the annular seal member 111 and the runner 112 and also may reduce or prevent oil leakage from the lower pressure fluid cavity 102. The flow of buffer air additionally reduces leakage from the lower pressure fluid cavity 102 toward the higher pressure fluid cavity 104 past the annular seal member 111 and/or the seal ring 110. The flow of buffer air across the annular seal member 111 may cause a small gap to be formed between the annular seal member 111 and runner 112. As the annular seal member 111 may ride on this small gap of buffer air, wear of the annular seal member 111 may be substantially reduced.

Figure 2:
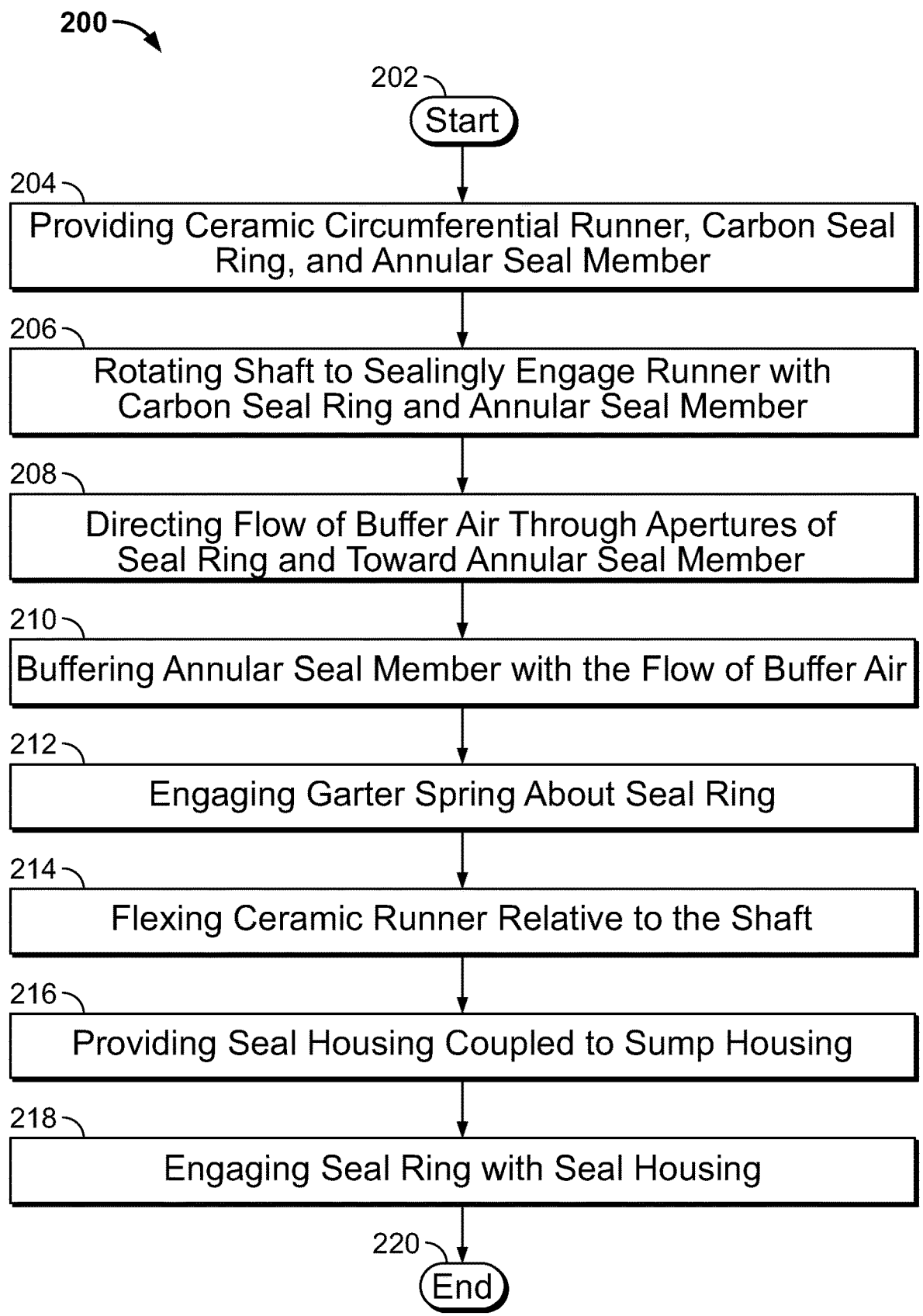
FIG. 2 is a flow diagram of a method in accordance with some embodiments of the present disclosure.

The present disclosure additionally provides methods of sealing a higher pressure fluid cavity 104 from a lower pressure fluid cavity 102. FIG. 2 presents a flow chart of one such method 200. The higher pressure fluid cavity 104 and lower pressure fluid cavity 102 are at least partly disposed between a rotatable shaft 106 and a housing 108 radially displaced from the rotatable shaft 106.

Method 200 starts at Block 202. The steps of method 200, presented at Blocks 202 through 220, may be performed in the order presented in FIG. 2 or in another order. One or more steps of the method 200 may not be performed.

At Block 204, a ceramic circumferential runner 112, a carbon seal ring 110, and an annular seal member 111 are provided. The runner 112 may be an annular member and may be radially displaced from the shaft 106. The runner 112 may be carried by the shaft 106. The runner 112 may be carried by the shaft 106 via a runner mounting assembly 118. The runner 112 may have a radially outward facing surface 120 extending axially along the shaft 106.

The seal ring 110 is disposed between the housing 108 and the shaft 106. The seal ring 110 may have a radially outward facing surface 114 and a radially inward facing seal surface 116. The seal ring may comprise carbon. The seal ring 110 may be an archbound carbon seal. The seal ring 110 may sealingly engage the runner 112. The seal ring 110 may define a plurality of apertures 117 that extend axially through the seal ring 110.

The annular seal member 111 is axially displaced from the seal ring 110 and may comprise a flexible and/or semi-rigid material. The annular seal member 111 may comprise Teflon or a Teflon derivative material. The annular seal member 111 may be an annular flexible ring that is flexed when positioned relative to the runner 112 (i.e. the annular seal member 111 may be flexed by contact with the runner 112). In some embodiments the annular seal member 111 may be formed as a curved member having a J-shaped cross section. The annular seal member 111 may have a curvilinear face surface 131 that engages the radially outward facing seal surface 120 of the runner 112.

At Block 206, the shaft 106 is rotated to sealingly engage the seal surface 120 of the runner with the carbon seal ring 110 and the annular seal member 111.

A flow of buffer air is directed through one or more of the plurality of apertures 117 at Block 208. The flow of buffer air is directed toward the annular seal member 111 in the lower pressure fluid cavity 102.

At Block 210, the annular seal member 111 is buffered by the flow of buffer air. The flow of buffer air flows through the plurality of apertures 117 and contacts the curvilinear face surface 131 of the annular seal member 111. The flow of buffer air buffers the annular seal member 111, reducing the friction between the annular seal member 111 and the runner 112. The flow of buffer air additionally reduces leakage from the lower pressure fluid cavity 102 toward the higher pressure fluid cavity 104 past the annular seal member 111 and/or the seal ring 110.

At Block 212 a garter spring 129 may be engaged about a radially outward facing surface 114 of the seal ring 110. At Block 214 the runner 112 may be flexed relative to the shaft 106 owing to the flexible arrangement of the runner mounting assembly 118. At Block 216 the method 200 may further comprise providing a seal housing 122 coupled to the housing 108 and, at Block 218, engaging the seal ring 110 with the seal housing 122.

Method 200 ends at Block 220.

The present disclosure provides numerous advantages over existing systems and methods of forming a seal in a rotating machine. The disclosed seal assembly 100 having a ceramic runner 112 generates heat during operation at a greatly reduced rate as compared to existing seal assemblies. This reduction in heat generation and high temperature capability of the ceramic runner results in a reduction and/or elimination of the need for direct application of oil for cooling purposes. Thus, the disclosed seal assembly 100 is intended to be oil-free. In sumps, there is generally an oil mist caused by the oil that is needed for bearings. Therefore, the seal assembly 100 may be generally exposed to oil or an oil mist, but direct oil cooling to the seal assembly 100 is not required.

Advantages of a low-heat-generation, oil-free seal assembly (seal assembly lacking direct application of oil) include reduced risk of oil coking, fires, and oil smell in cabin air systems; and avoidance of excessive stresses on the runner, and excessive wear of the seal ring. Additionally, the removal of the requirement to directly apply oil to the runner may result in smaller sump sizes (owing to a lower volume of oil to be collected in the sump), smaller and more simple systems associated with direct application of oil (oil passageways, breathers, etc.), and less overall system complexity.

Further, the use of a ceramic runner and carbon seal ring aides in maintaining a sufficient seal across a broad range of operating conditions, including takeoff-to-cruise and cruise-to-idle operations. Seal maintenance during thermal transient operations reduce and/or eliminate oil leakage past the seal.

The use of a buffered lip seal is also advantageous. Specifically, the flow of buffering air across the annular seal member may create a small gap between the seal member and the runner during operation. This gap reduces wear of the seal member, thus allowing use of a seal member that may not otherwise be used for similar high temperature and high rotational speed applications. The reduction of seal member wear reduces required system maintenance and improves system durability. The buffered lip seal also reduces and/or eliminates oil leakage past the seal.

Although examples are illustrated and described herein, embodiments are nevertheless not limited to the details shown, since various modifications and structural changes may be made therein by those of ordinary skill within the scope and range of equivalents of the claims.

What is claimed is:

1. A seal assembly for sealing a higher pressure fluid cavity from a lower pressure fluid cavity, said cavities at least partially disposed between a rotatable shaft and a housing radially displaced from said rotatable shaft, the seal assembly comprising:
   a runner mounting assembly carried by said shaft;
   a circumferential ceramic runner carried by said runner mounting assembly having a radially outward facing seal surface extending axially along the shaft;
   a carbon seal ring sealing engaged with the housing and having a radially inward facing seal surface that sealingly engages at least a portion of said radially outward facing seal surface of said runner to thereby form a boundary between the higher pressure fluid cavity and the lower pressure fluid cavity; and
   an annular seal member coupled to the housing axially displaced from said seal ring in the lower pressure fluid cavity, the seal member having a curvilinear face surface that engages said radially outward facing seal surface of said runner.

2. The seal assembly of claim 1 wherein said higher pressure fluid cavity comprises at least in part a buffer air chamber, and wherein a plurality of apertures extending axially through the seal ring direct a flow of buffer air from the buffer air chamber toward the annular seal member.

3. The seal assembly of claim 1 wherein the runner mount assembly comprises a metallic runner mount.

4. The seal assembly of claim 3 wherein said runner is carried by said runner mount by an interference fit.

5. The seal assembly of claim 1 wherein said curvilinear face surface bends from an axially-facing surface to a radially-facing surface, and wherein said radially-facing surface engages said radially outward facing seal surface of said runner.

6. The seal assembly of claim 5 wherein said annular seal member has a J-shaped cross section taken along the shaft.

7. The seal assembly of claim 6 wherein said annular seal member comprises Teflon.

8. The seal assembly of claim 5 wherein said annular seal member comprises a flexible ring that bends in contact with said runner.

9. The seal assembly of claim 1 wherein said runner comprises one or more of silicon carbide, silicon nitride, and alumina.

10. The seal assembly of claim 1 wherein said seal ring is an archbound seal ring.

11. The seal assembly of claim 1 wherein said runner and said seal ring are formed from materials having coefficients of thermal expansion that are matched to effect sealing engagement between said runner and said seal ring over a predetermined range of operating temperatures.

12. The seal assembly of claim 1 further comprising a garter spring coupled to a radially outward facing surface of the seal ring, the garter spring sealingly engaging the radially inward facing seal surface of the seal ring with the radially outward facing seal surface of the ceramic runner across a predetermined range of rotational speeds.

13. A method of sealing a higher pressure fluid cavity from a lower pressure fluid cavity, said cavities at least partially disposed between a rotatable shaft and a housing radially displaced from said rotatable shaft, the method comprising:
   providing a ceramic circumferential runner, a carbon seal ring, and an annular seal member, wherein the ceramic circumferential runner is carried by a runner mounting assembly coupled to the shaft, the runner having a radially outward facing seal surface extending axially along the shaft, the carbon seal ring is disposed radially outward of the runner and defines a plurality of apertures passing axially through the seal ring, and the annular seal member is axially displaced from the carbon seal ring;
   rotating the shaft to sealingly engage the seal surface of the runner with the carbon seal ring and the annular seal member; and
   directing a flow of buffer air through one or more of the plurality of apertures and toward the annular seal member.

14. The method of claim 13 further comprising buffering the annular seal member with the flow of buffer air to form a gap between the annular seal member and the runner.

15. The method of claim 13 further comprising engaging a garter spring about a radially outward facing surface of the seal ring.

16. The method of claim 13 further comprising flexing the ceramic runner relative to the shaft.

17. The method of claim 13 further comprising:
   providing a seal housing coupled to said housing; and
   engaging said seal ring with said seal housing.

18. A seal assembly for sealing a higher pressure fluid cavity from a lower pressure fluid cavity, said cavities at least partially disposed between a rotatable shaft and a housing radially displaced from said rotatable shaft, the seal assembly comprising:
   a circumferential ceramic runner carried by said shaft;
   a carbon seal ring sealing engaged with the housing and at least a portion of said runner to thereby form a boundary between the higher pressure fluid cavity and the lower pressure fluid cavity; and an annular seal member coupled to the housing axially displaced from said seal ring in the lower pressure fluid cavity, the seal member having a J-shaped cross section taken along the shaft and a curvilinear face surface that engages said runner.

19. The seal assembly of claim 18 wherein said curvilinear face surface bends from an axially-facing surface to a radially-facing surface, and wherein said radially-facing surface engages said radially outward facing seal surface of said runner.

20. The seal assembly of claim 19 wherein said annular seal member comprises Teflon.

\* \* \* \* \*